United States Patent [19]
Rockenfeller et al.

[11] Patent Number: 5,123,791
[45] Date of Patent: Jun. 23, 1992

[54] ROCK ANCHOR

[75] Inventors: Gottfried Rockenfeller, Hilchenbach; Wolfgang Rockenfeller, Hilchenbach-Helberhausen, both of Fed. Rep. of Germany

[73] Assignee: Rockenfeller KG, Hilchenbach, Fed. Rep. of Germany

[21] Appl. No.: 664,061

[22] Filed: Mar. 4, 1991

[30] Foreign Application Priority Data

Mar. 2, 1990 [DE] Fed. Rep. of Germany ....... 4006615

[51] Int. Cl.⁵ .............................................. F16B 13/04
[52] U.S. Cl. ......................................... 411/41; 411/54
[58] Field of Search ............... 411/354, 75, 24, 25, 411/40, 41, 54, 44

[56] References Cited

U.S. PATENT DOCUMENTS 1,798,273  3/1931  Pleister ............................ 411/354
4,906,149  3/1990  Rockenfeller .
4,930,963  6/1990  Rockenfeller et al. ............ 411/54 X

FOREIGN PATENT DOCUMENTS 3314109  10/1984  Fed. Rep. of Germany ........ 411/75
3816662  11/1989  Fed. Rep. of Germany .

Primary Examiner—Rodney M. Lindsey
Attorney, Agent, or Firm—Herbert Dubno; Andrew Wilford

[57] ABSTRACT

A rock anchor adapted to be mounted in a bore opening at a rock face has a sleeve extending along a sleeve axis and having a body extending along an axis and having an inner end remote from the rock face and an inside surface and an outer end formed with a large-diameter head adapted to lie against the rock face. A wedge in the sleeve at the inner end has a flank extending at an acute angle to the axis. This wedge is fixed in the sleeve against axial movement therein. A drive pin engageable axially in the sleeve has a point engageable between the wedge flank and the inside surface of the sleeve so that when the sleeve is forcibly driven axially into the sleeve its point engages between the flank and the inside surface and plastically deforms the inside surface outward into tight engagement with the rock.

12 Claims, 1 Drawing Sheet

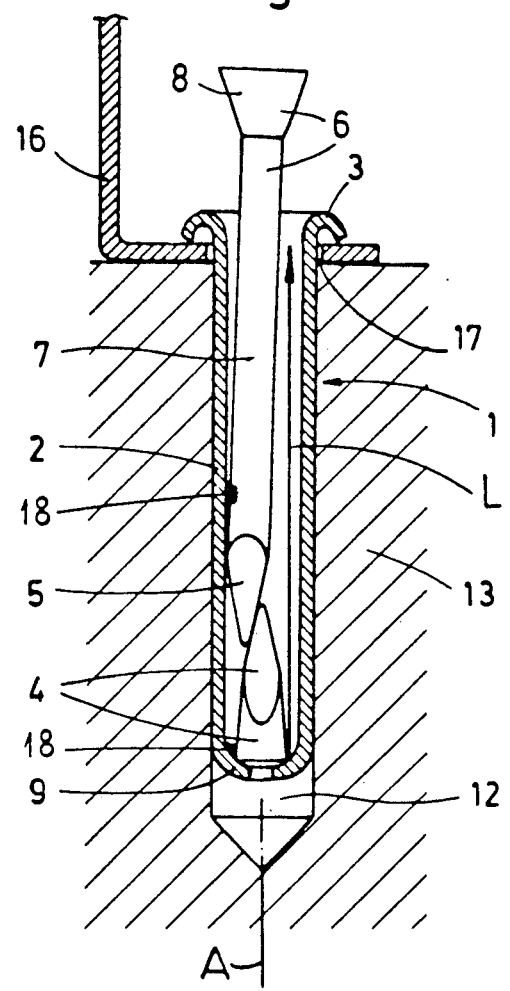
Fig. 1
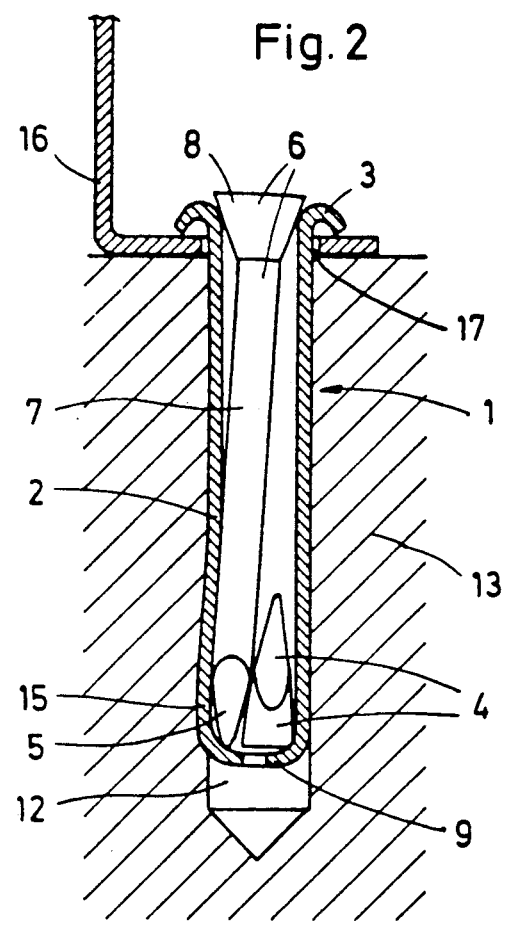
Fig. 2
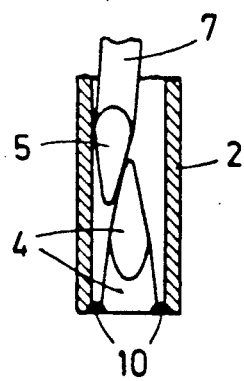
Fig. 3
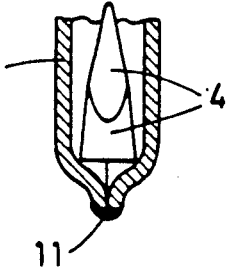
Fig. 4
Fig. 5

ROCK ANCHOR

FIELD OF THE INVENTION

The present invention relates to a rock anchor. More particularly this invention concerns an anchor assembly adapted to be mounted in a blind bore in rock.

BACKGROUND OF THE INVENTION

A rock anchor is known from earlier U.S. Pat. No. 4,906,149 which comprises a sleeve formed of ST34 or ST37 plastically deformable steel and having an outer end formed as an enlarged head so that the sleeve can be inserted in a bore in a rocky mass with the head lying against the face of the rock. At its inner end the sleeve is provided with a hard wedge having a flank or face extending at a sharp acute angle to the longitudinal axis of the sleeve. A spreading element is engageable between this inclined flank and the adjacent inside surface of the sleeve, and a drive pin can be hammered into the sleeve to push the spreading element in. This action forces the wedge back in the sleeve and simultaneously jams the spreading element between the wedge and the inside sleeve surface to plastically deform the sleeve outward, thereby solidly locking it in the rock hole. Such an anchor can withstand withdrawal forces of 10,000N (1000 kp) in a hard rock or concrete wall.

For best results the bore in which the anchor is set must be equal to or at most only slightly-longer than the length of the sleeve from the inside face of its head to its inner end. When, however, the hole is made too deep, something that is relatively common when boring with a big hammer drill, the hold that the anchor will attain will be substantially diminished because the wedge will be driven at least partially out the back or inner end of the sleeve. It is even possible for the hole to be so long that the wedge is driven completely out of the inner end of the sleeve, so that there is no deformation at all of the sleeve and the anchor is useless.

OBJECTS OF THE INVENTION

It is therefore an object of the present invention to provide an improved rock anchor.

Another object is the provision of such an improved rock anchor which overcomes the above-given disadvantages, that is which is not sensitive to the length of the hole it is set in.

SUMMARY OF THE INVENTION

A rock anchor adapted to be mounted in a bore opening at a rock face according to this invention has a sleeve extending along a sleeve axis and having a body extending along an axis and having an inner end remote from the rock face and an inside surface and an outer end formed with a large-diameter head adapted to lie against the rock face. A wedge in the sleeve at the inner end has a flank extending at an acute angle to the axis. This wedge is fixed in the sleeve against axial movement therein. A drive pin engageable axially in the sleeve has a point engageable between the wedge flank and the inside surface of the sleeve so that when the sleeve is forcibly driven axially into the sleeve its point engages between the flank and the inside surface and plastically deforms the inside surface outward into tight engagement with the rock.

With this system, therefore, the depth of the bore is relatively unimportant since the wedge cannot be pushed out the inner end of the sleeve. In every case the lateral expansion will be at exactly the same location, even if the bore is much longer than the sleeve.

According to a feature of the invention the inner sleeve end is formed with an abutment that itself serves to axially fix the wedge. The abutment can be a turned-in wall or end of the sleeve. It can also be a weld, which term is intended to cover a brazed or soldered connection, interconnecting the wedge and the inner sleeve end.

The drive pin of this invention has an overall length equal generally to the longitudinal distance between the inner end and the head. The point on the inner end of this drive pin coacts with the wedge.

To ease handling of the rock anchor of this invention prior to installation the pin is movable between an outer starting position lightly pinched between the wedge and the inner surface and an inner end position solidly pinched therebetween and axially further in the sleeve than in the outer position. Thus in the outer position the drive pin is retained. This effect can also be achieved according to the invention by using a relatively weak adhesive releasably securing the pin to the wedge in the outer position. Instead of the adhesive a resilient mass filling the sleeve around the pin or a cork or foam-rubber plug can retain the pin in place therein in the outer position.

BRIEF DESCRIPTION OF THE DRAWING

The above and other objects, features, and advantages will become more readily apparent from the following, reference being made to the accompanying drawing in which:

FIGS. 1 and 2 are axial sections through the rock anchor according to this invention before and after setting;

FIGS. 3 and 4 are axial sections of the inside end of variants on the system of FIGS. 1 and 2; and FIG. 5 is an axial section through the outer end of another variant on the anchor of this invention.

SPECIFIC DESCRIPTION

As seen in FIGS. 1 and 2 a rock anchor 1 according to the invention comprises a cylindrical sleeve 2 centered on an axis A and having an outer end that is turned out to form a head 3 and an inner end that is turned in to form an abutment 9. Inside this sleeve 2 at its inner end is a wedge 4, here constituted as a four-sided pyramidal body having an apex angle of about 25°. This wedge 4 has a length equal to only about one-fifth of the overall length L of the sleeve 2 and a diameter at its widest point that is substantially greater than half of the inside diameter of the sleeve 2. The sleeve 2 and wedge 4 are formed of a relatively hard steel.

According to the invention a drive pin 6 formed basically as a nail has a shaft 7 of a diameter equal to somewhat more than half of the inside diameter of the sleeve 2. This pin 6 is formed of mild steel and has an inner end formed as a point or drive body 5 substantially identical to the wedge 4 and an outer end formed with a frustoconical head 8 of a maximum diameter equal to slightly more than the inside diameter of the sleeve 2. Of course it would be possible to provide only one inclined flank on both the wedge 4 and the point 5, but providing such inclined facets all around makes use of the system easier.

In use a cylindrical hole 12 of an inside diameter equal to the outside diameter of the sleeve 2 and a length equal to somewhat more than the length L of the anchor 1 is bored in a rock mass 13. The sleeve 2, in which the wedge 4 and pin 6 are provisionally secured by dabs 17 of adhesive, is then inserted into the bore 12, normally through a hole 17 in a hanger bracket 16. This leaves the parts in the position of FIG. 1.

Then the head 8 is struck a hard blow with a hammer or the like so as to move it axially inward until its head 8 wedges in the outer end of the sleeve 2 and its point 5 moves axially along side the wedge 4. Since the combined diameters of the shaft 7 and wedge 4 are substantially more than the inside diameter of the sleeve 2, the sleeve 2 will be bulged out as shown at 15, forcing it into very solid contact with the inside of the bore 12 and fixing it in the rock 13. As the pin 6 is driven in, the adhesive dabs 17 will of course release; they serve only to hold the parts together so they do not get lost prior to installation.

FIG. 3 shows how instead of a turned-in inner end 9, the sleeve 2 can be welded, brazed, or soldered to the wedge 4 at 10. In FIG. 4 the inner end of the sleeve 2 is pinched together and welded at 11 to form a solid inner-end abutment for the wedge 4.

FIG. 5 shows how the interior of the sleeve around the shaft 7 can be filled with a foam material 14 to hold the parts together prior to installation.

We claim:

1. A rock anchor adapted to be mounted in a bore opening at a rock face, the anchor comprising:
   a sleeve extending along a sleeve axis and having
      a body extending along an axis and having an inner end remote from the rock face and an inside surface, and
      an outer end formed with a large-diameter head adapted to lie against the rock face;
   a wedge in the sleeve at the inner end having a flank extending at an acute angle to the axis;
   means including an abutment formed in the inner sleeve end for fixing the wedge in the sleeve against axial movement therein; and
   a drive pin engageable axially in the sleeve and having a point engageable between the wedge flank and the inside surface of the sleeve, whereby when the sleeve is forcibly driven axially into the sleeve its point engages between the flank and the inside surface and plastically deforms the inside surface outward into tight engagement with the rock.

2. The rock anchor defined in claim 1 wherein the drive pin has an overall length equal generally to the longitudinal distance between the inner end and the head.

3. The rock anchor defined in claim 1 wherein the pin is movable between an outer starting position lightly pinched between the wedge and the inner surface and an inner end position solidly pinched therebetween and axially further in the sleeve than in the outer position.

4. The rock anchor defined in claim 1 wherein the pin is movable in the sleeve between a outer starting position and an inner end position solidly pinched between the wedge and the inner surface and axially further in the sleeve than in the outer position.

5. The rock anchor defined in claim 4, further comprising
   a relatively weak adhesive releasably securing the pin to the wedge in the outer position.

6. The rock anchor defined in claim 4, further comprising
   a resilient mass filling the sleeve around the pin and retaining the pin in place therein.

7. A rock anchor adapted to be mounted in bore opening at a rock face, the anchor comprising:
   a sleeve extending along a sleeve axis and having
      a body extending along an axis and having an inner end remote from the rock face and an inside surface, and
      an outer end formed with a large-diameter head adapted to lie against the rock face;
   a wedge in the sleeve at the inner end having a flank extending at an acute angle to the axis;
   a weld interconnecting the wedge and the inner sleeve end against relative axial movement; and
   a drive pin engageable axially in the sleeve and having a point engageable between the wedge flank and the inside surface of the sleeve, whereby when the sleeve is forcibly driven axially into the sleeve its point engages between the flank and the inside surface and plastically deforms the inside surface outward into tight engagement with the rock.

8. The rock anchor defined in claim 7 wherein the pin is movable between an outer starting position lightly pinched between the wedge and the inner surface and an inner end position solidly pinched therebetween and axially further in the sleeve than in the outer position.

9. The rock anchor defined in claim 7 wherein the drive pin has an overall length equal generally to the longitudinal distance between the inner end and the head.

10. The rock anchor defined in claim 7 wherein the pin is movable in the sleeve between an outer starting position and an inner end position solidly pinched between the wedge and the inner surface and axially further in the sleeve than in the outer position.

11. The rock anchor defined in claim 10, further comprising
    a resilient mass filling the sleeve around the pin and retaining the pin in place therein.

12. The rock anchor defined in claim 10, further comprising
    a relatively weak adhesive releasably securing the pin to the wedge in the outer position.

* * * * *